US012542390B2

(12) United States Patent
Nishijima

(10) Patent No.: US 12,542,390 B2
(45) Date of Patent: Feb. 3, 2026

(54) TERMINAL UNIT HAVING MALE TERMINAL WITH INCLINED PORTIONS

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventor: Seido Nishijima, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 314 days.

(21) Appl. No.: 18/038,848

(22) PCT Filed: Dec. 3, 2021

(86) PCT No.: PCT/JP2021/044548
§ 371 (c)(1),
(2) Date: May 25, 2023

(87) PCT Pub. No.: WO2022/124235
PCT Pub. Date: Jun. 16, 2022

(65) Prior Publication Data
US 2023/0420877 A1 Dec. 28, 2023

(30) Foreign Application Priority Data
Dec. 11, 2020 (JP) ................................ 2020-206267

(51) Int. Cl.
*H01R 13/04* (2006.01)
*H01R 11/22* (2006.01)
*H01R 13/18* (2006.01)

(52) U.S. Cl.
CPC ............ *H01R 13/18* (2013.01); *H01R 13/04* (2013.01)

(58) Field of Classification Search
CPC ........ H01R 11/22; H01R 13/04; H01R 13/11; H01R 13/113; H01R 13/18; H01R 4/023
See application file for complete search history.

(56) References Cited

U.S. PATENT DOCUMENTS 6,056,604 A * 5/2000 Roy .................... H01R 13/187 439/845
10,389,055 B1 * 8/2019 Lui ...................... H01R 13/187
(Continued)

FOREIGN PATENT DOCUMENTS

JP S52-078091 U1 6/1977
JP S59-031774 U1 2/1984
(Continued)

OTHER PUBLICATIONS

International Search Report issued on Feb. 1, 2022 for WO 2022/124235 A1 (6 pages).

*Primary Examiner* — Abdullah A Riyami
*Assistant Examiner* — Thang H Nguyen
(74) *Attorney, Agent, or Firm* — Venjuris, P.C.

(57) ABSTRACT

A terminal unit includes a plate-like male terminal and a female terminal to be connected to the male terminal. The female terminal includes a pair of connecting portions arranged to face each other across a male terminal insertion gap, and a resilient member for biasing the pair of connecting portions in directions approaching each other. The male terminal includes a pair of inclined portions inclined toward one side in a plate thickness direction of the male terminal (Continued)

on both sides in a plate width direction intersecting an inserting direction into the male terminal insertion gap. The connecting portion of the female terminal facing a surface on the other side in the plate thickness direction of the male terminal includes a pair of first projection-like contact point portions configured to respectively contact the pair of inclined portions of the male terminal arranged in the male terminal insertion gap.

8 Claims, 9 Drawing Sheets

(56) References Cited

U.S. PATENT DOCUMENTS

| | | | | |
|---|---|---|---|---|
| 2010/0197178 | A1* | 8/2010 | Hotea | H01R 13/11 439/852 |
| 2018/0090854 | A1* | 3/2018 | Lewis | H01R 13/187 |
| 2019/0190180 | A1* | 6/2019 | Maruno | H01R 13/111 |
| 2019/0305459 | A1* | 10/2019 | Mori | H01R 13/113 |
| 2020/0403342 | A1* | 12/2020 | Nishijima | H01R 13/193 |
| 2021/0104833 | A1* | 4/2021 | Mukuno | H01R 13/187 |
| 2022/0352652 | A1* | 11/2022 | Yudate | H01R 43/0207 |

FOREIGN PATENT DOCUMENTS

| | | | | |
|---|---|---|---|---|
| JP | 2009-277436 A | | 11/2009 | |
| JP | 2011-238558 A | | 11/2011 | |
| JP | 2011238558 | * | 11/2011 | H01R 13/193 |
| JP | 2014-078355 A | | 5/2014 | |
| WO | WO-2021029188 A1 | * | 2/2021 | H01R 13/20 |

* cited by examiner

TERMINAL UNIT HAVING MALE TERMINAL WITH INCLINED PORTIONS

CROSS REFERENCE TO RELATED APPLICATIONS

This application is a national phase of PCT application No. PCT/JP2021/044548, filed on 3 Dec. 2021, which claims priority from Japanese patent application No. 2020-206267, filed on 11 Dec. 2020, all of which are incorporated herein by reference.

TECHNICAL FIELD

The present disclosure relates to a terminal unit.

BACKGROUND

Patent Document 1 discloses a terminal unit composed of a male terminal having a flat plate shape called a tab shape and a female terminal to be connected to the male terminal. The female terminal includes a pair of connecting portions arranged to face each other across a male terminal insertion gap, and each connecting portion includes a projection-like contact point portion projecting inward in a facing direction. The pair of connecting portions are biased in directions approaching each other along the facing direction by a spring clip mounted on a body portion. The male terminal inserted through the male terminal insertion gap is sandwiched between the contact point portions, whereby the male terminal and the female terminal are electrically connected.

PRIOR ART DOCUMENT

Patent Document

Patent Document 1: JP 2011-238558 A

SUMMARY OF THE INVENTION

Problem to be Solved

Since the terminal unit of Patent Document 1 is structured to sandwich the flat plate-like male terminal between the contact point portions of the female terminal, a gripping force against an external force in a plate width direction of the male terminal is small. Thus, a wall portion or the like for restricting a displacement of the male terminal in the plate width direction is provided. However, the male terminal is displaced with respect to the female terminal until coming into contact with the wall or the like for restricting the displacement. Thus, a contact resistance value is thought to increase due to fine sliding friction between the male and female terminals by vibration or the like, wherefore a further improvement has been required.

Accordingly, a terminal unit of a novel structure is disclosed which can suppress a displacement of a male terminal in a plate width direction with respect to a female terminal.

Means to Solve the Problem

The present disclosure is directed to a terminal unit with a plate-like male terminal and a female terminal to be connected to the male terminal, the female terminal including a pair of connecting portions arranged to face each other across a male terminal insertion gap, the male terminal being inserted into the male terminal insertion gap to be arranged, and a resilient member for biasing the pair of connecting portions in directions approaching each other, the male terminal including a pair of inclined portions inclined toward one side in a plate thickness direction of the male terminal on both sides in a plate width direction, the plate width direction being a direction intersecting an inserting direction into the male terminal insertion gap, and the connecting portion of the female terminal facing a surface on the other side in the plate thickness direction of the male terminal including a pair of first projection-like contact point portions configured to respectively contact the pair of inclined portions of the male terminal arranged in the male terminal insertion gap.

Effect of the Invention

According to the terminal unit of the present disclosure, it is possible to suppress a displacement of the male terminal in the plate width direction with respect to the female terminal.

DETAILED DESCRIPTION TO EXECUTE THE INVENTION

Description of Embodiments of Present Disclosure

Figure 1:
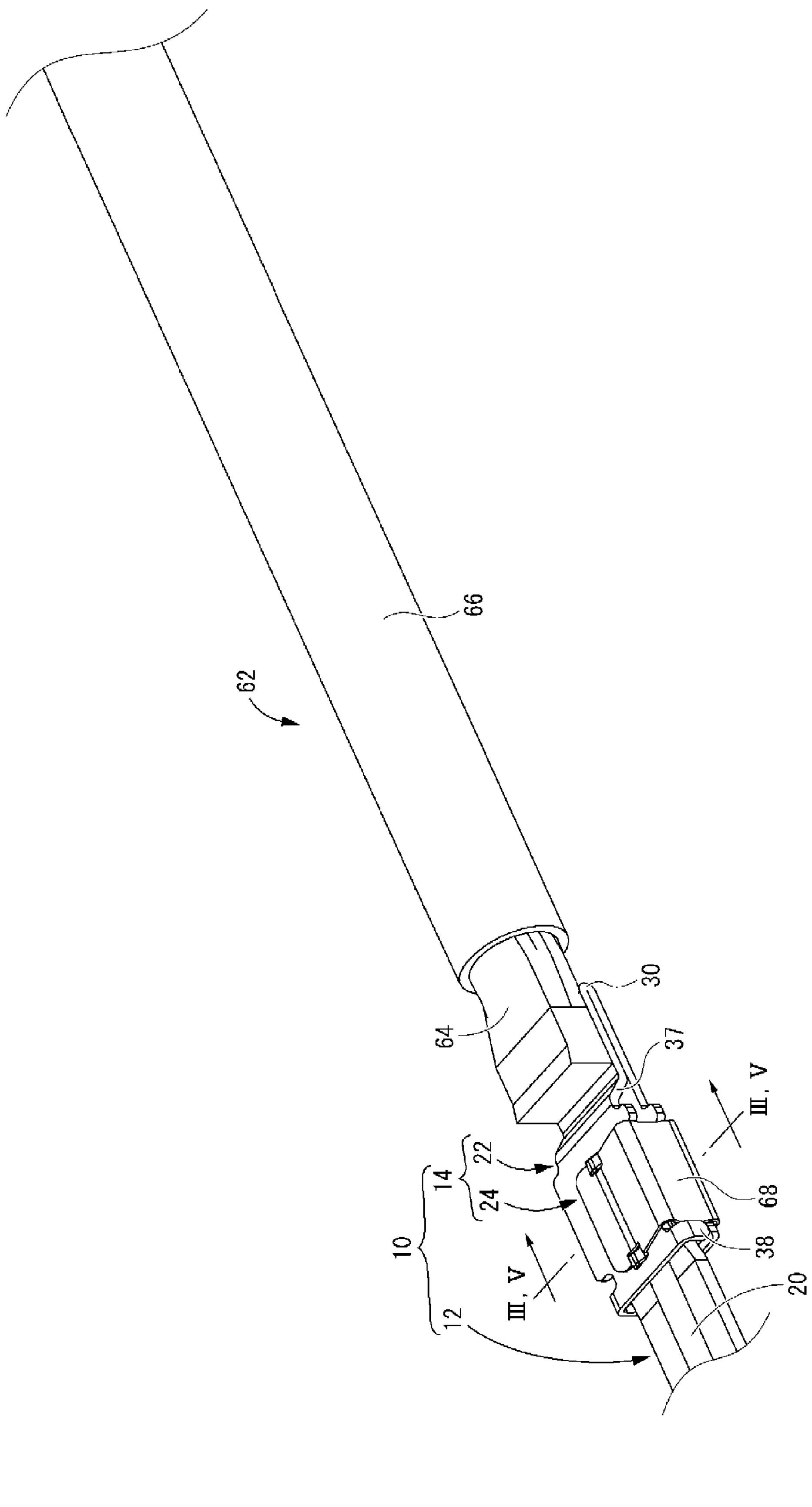
FIG. 1 is a perspective view of a terminal unit according to a first embodiment showing a state where a male terminal is inserted in a female terminal.

First, embodiments of the present disclosure are listed and described.

(1) The terminal unit of the present disclosure is provided with a plate-like male terminal and a female terminal to be connected to the male terminal, the female terminal including a pair of connecting portions arranged to face each other across a male terminal insertion gap, the male terminal being inserted into the male terminal insertion gap to be arranged, and a resilient member for biasing the pair of connecting portions in directions approaching each other, the male terminal including a pair of inclined portions inclined toward one side in a plate thickness direction of the male terminal on both sides in a plate width direction, the plate width direction being a direction intersecting an inserting direction into the male terminal insertion gap, and the connecting portion of the female terminal facing a surface on the other side in the plate thickness direction of the male terminal including a pair of first projection-like contact point portions configured to respectively contact the pair of inclined portions of the male terminal arranged in the male terminal insertion gap.

According to the terminal unit of the present disclosure, the male terminal includes the pair of inclined portions inclined toward the one side in the plate thickness direction of the male terminal on the both sides in the plate width direction of the male terminal, and the female terminal includes the pair of first projection-like contact point portions configured to respectively contact the pair of inclined portions of the male terminal in the connecting portion facing the surface on the other side in the plate thickness direction of the male terminal. In this way, when an external force is applied to displace the male terminal in the plate width direction, the inclined portions of the male terminal are pressed by the first projection-like contact point portions of the female terminal on the both sides in the plate width direction of the male terminal to generate inward component forces in the plate width direction. As a result, as compared to conventional structures, a force for hindering a displacement of the male terminal in the plate width direction against the external force in the plate width direction of the male terminal can be increased and a displacement of the male terminal in the plate width direction with respect to the female terminal can be suppressed. In that way, it is possible to suppress fine sliding friction between the male and female terminals due to vibration or the like and an increase of a contact resistance value caused by the fine sliding friction.

(2) Preferably, the male terminal includes a flat portion arranged between the pair of inclined portions in the plate width direction, and the connecting portion of the female terminal facing the surface on the one side in the plate thickness direction of the male terminal includes a second projection-like contact point portion configured to contact the flat portion of the male terminal arranged in the male terminal insertion gap. The second projection-like contact point portion of the female terminal is pressed by the flat portion of the male terminal from the one side in the plate thickness direction of the male terminal, and the first projection-like contact point portions of the female terminal are pressed by the pair of inclined portions of the male terminal from the other side in the plate thickness direction of the male terminal. In this way, the male terminal can be stably held by three contact point portions of the female terminal and contact resistance can be reduced.

(3) Preferably, the respective first projection-like contact point portions continuously extend in the inserting direction of the male terminal into the male terminal insertion gap. Since the first projection-like contact point portions continuously extend in the inserting direction of the male terminal, a contact area between the male and female terminals can be stably secured and a contact pressure between the both terminals can be reduced.

(4) Preferably, the respective first contact point portions are provided at two positions separated from each other in the inserting direction of the male terminal into the male terminal insertion gap, and a separation distance in the inserting direction between the two positions is larger than a dimension in the plate width direction of the flat portion of the male terminal. Since the respective first projection-like contact point portions of the female terminal are provided at the two positions separated by the dimension larger than the dimension in the plate width direction of the flat portion of the male terminal, four first projection-like contact point portions are arranged apart from each other in a view of the pair of connecting portions of the female terminal in a facing direction. Therefore, the male terminal can be inserted into the male terminal insertion gap of the female terminal from two orthogonal directions and the versatility of the terminal unit can be improved.

(5) Preferably, a part located on a front side in the inserting direction of the male terminal into the male terminal insertion gap in each of the first projection-like contact point portions has a round chamfered shape. Since the part located on the front side in the inserting direction of the male terminal in the first projection-like contact point portion has the round chamfered shape, an insertion force in inserting the male terminal into the male terminal insertion gap can be smoothly increased.

Details of Embodiments of Present Disclosure

Specific examples of a terminal unit of the present disclosure are described below with reference to the drawings. Note that the present disclosure is not limited to these illustrations and is represented by claims and intended to include all changes in the scope of claims and in the meaning and scope of equivalents.

First Embodiment

Hereinafter, a terminal unit 10 of a first embodiment of the present disclosure is described using FIGS. 1 to 5. The terminal unit 10 is provided with a male terminal 12 and a female terminal 14. The male and female terminals 12, 14 are electrically connected by inserting the male terminal 12 into the female terminal 14 to bring the both terminals 12, 14 into contact with each other. Note that, in the following description, a vertical direction means a vertical direction in FIG. 3 and a lateral direction means a lateral direction in FIG. 3. Further, a front-rear direction is a direction orthogonal to the plane of FIG. 3, a forward direction is a direction forward of the plane of FIG. 3, and a rearward direction is a direction backward of the plane of FIG. 3.

Male Terminal 12

The male terminal 12 is plate-like as a whole and constituted using an unillustrated flat plate fitting. The flat plate fitting has a rectangular shape, has a predetermined width (dimension in the lateral direction in FIG. 3) and a predetermined thickness (dimension in the vertical direction in FIG. 3) and extends straight. Note that, in the male terminal 12, an end part on a front side in an inserting direction has a tapered shape. The male terminal 12 is electrically conductive and formed of metal low in electrical resistance such as copper, copper alloy, aluminum or aluminum alloy.

On a front side in the inserting direction of this flat plate fitting, both end parts in a width direction of the male terminal 12 are provided with a pair of inclined portions 16, 16 by inclining the both end parts in the width direction toward one side (upper side) in a plate thickness direction over a predetermined region from an end part. That is, in the male terminal 12, the pair of inclined portions 16, 16 are provided on both sides in a plate width direction, which is a direction intersecting, orthogonal to in this embodiment, the inserting direction into a male terminal insertion gap 36 to be described later. A flat portion 18 expanding flat is provided in a central part in the width direction on the front side in the inserting direction of the male terminal 12, i.e. between the inclined portions 16 and 16 on the both sides in the width direction.

As described later, with the male terminal 12 inserted in the male terminal insertion gap 36 of the female terminal 14, one surface (upper surface) in the plate thickness direction is facing a first connecting portion 26 of the female terminal 14 and the other surface (lower surface) in the plate thickness direction is facing a second connecting portion 28 of the female terminal 14. The lower surfaces of the inclined portions 16, 16 contact first projection-like contact point portions 56 provided on the second connecting portion 28 and the upper surface of the flat portion 18 contacts a second projection-like contact point portion 52 provided on the first connecting portion 26.

An angle of inclination θ (see FIG. 3) of the inclined portion 16 with respect to a horizontal direction (direction orthogonal to the vertical direction) is not limited, but preferably 5° or more and more preferably 10° or more. By setting the angle of inclination θ of the inclined portion 16 to 5° or more, an inward component force in the plate width direction can be effectively caused to act and an outward displacement of the male terminal 12 in the plate thickness direction can be suppressed when an outward external force in the plate thickness direction is input to the male terminal 12. Further, the angle of inclination θ of the inclined portion 16 is, for example, preferably set to 45° or less and more preferably 30° or less. By setting the angle of inclination θ of the inclined portion 16 to 45° or less, dimensions in the vertical direction of the male terminal 12 and, eventually, the terminal unit 10 can be suppressed to be small.

A part of the male terminal 12 behind a formation region of the inclined portions 16, 16 in the inserting direction is a flat plate portion 20 extending straight. The formation region of the inclined portions 16, 16 is located slightly above the flat plate portion 20. The flat plate portion 20 is, for example, provided with a bolt insertion hole and fixed to a terminal portion of a device or fixed to a wire.

Female Terminal 14

Figure 2:
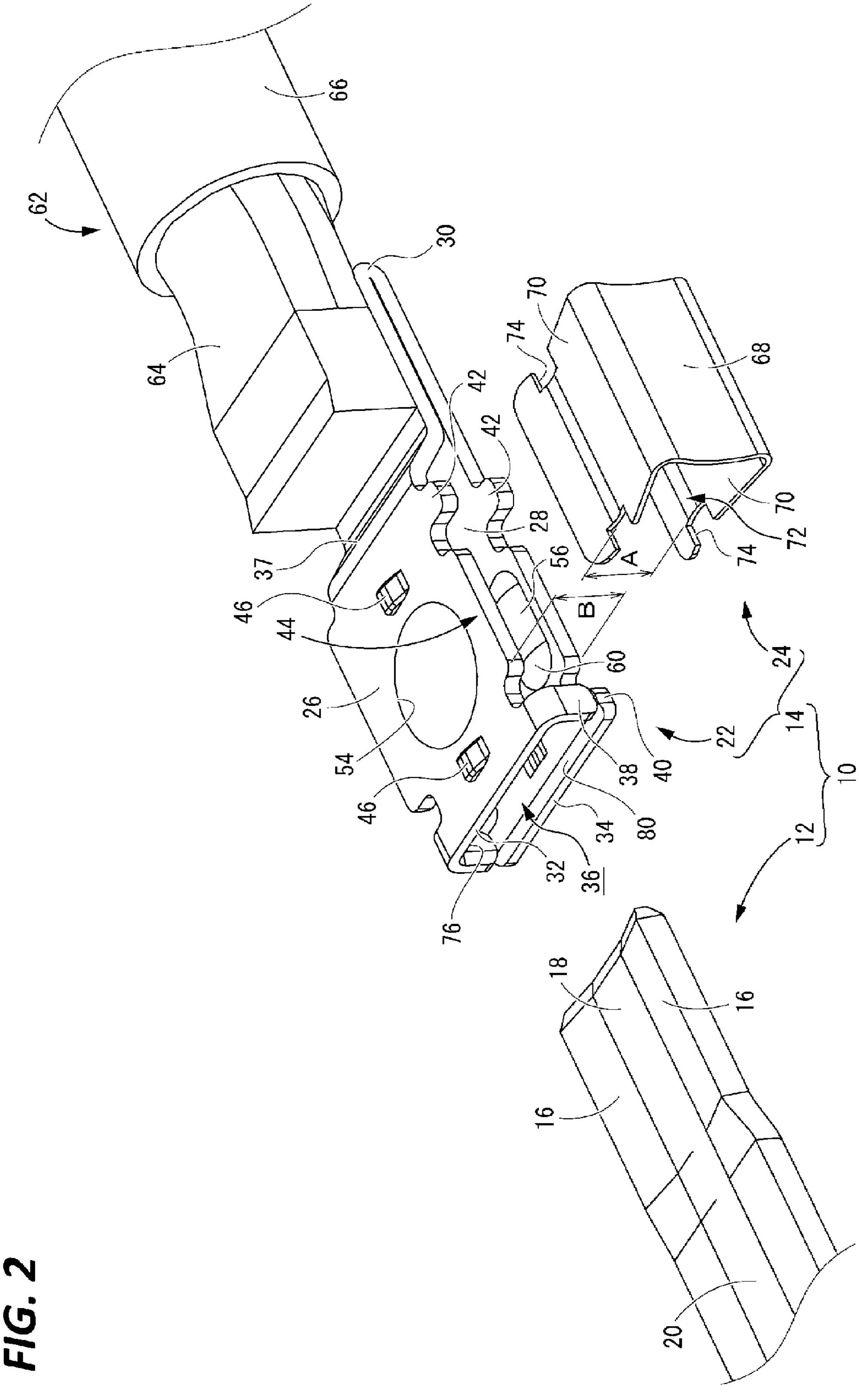
FIG. 2 is an exploded perspective view of the terminal unit shown in FIG. 1.

As also shown in FIG. 2, the female terminal 14 is configured by mounting a clip spring 24 serving as a resilient member on a female terminal fitting 22.

Female Terminal Fitting 22

The female terminal fitting 22 is made of metal such as copper, copper alloy, aluminum or aluminum alloy. The female terminal fitting 22 includes the first connecting portion 26 and the second connecting portion 28 serving as a pair of connecting portions and arranged to face each other in the vertical direction. In the first embodiment, the female terminal fitting 22 is formed by press-working a substantially strip-like metal flat plate, and a folded portion 30 is formed in a rear end part of the female terminal fitting 22 by folding an intermediate part in a length direction of the substantially strip-like metal flat plate. In the substantially strip-like metal flat plate, the first connecting portion 26 is provided on the side of one end part 32 in the length direction and the second connecting portion 28 is provided on another end part 34 in the length direction across the folded portion 30. In the first embodiment, the first connecting portion 26 is located above the second connecting portion 28. A front end part of the female terminal fitting 22 is constituted by the both end parts 32, 34 in the length direction of the substantially strip-like metal flat plate.

Each of these first and second connecting portions 26, 28 has a substantially rectangular shape in a plan view (projection in the vertical direction) and has a width (dimension in the lateral direction) larger than the male terminal 12. The first and second connecting portions 26, 28 are separated from each other in the vertical direction, and the male terminal insertion gap 36, into which the male terminal 12 is inserted to be arranged as described later, is constituted by a space between these first and second connecting portions 26, 28. In short, the first and second connecting portions 26, 28 serving as the pair of connecting portions are arranged to face each other in the vertical direction across the male terminal insertion gap 36. In the female terminal fitting 22, the male terminal insertion gap 36 is open on a front side and both sides in the lateral direction.

In the female terminal fitting 22, the first connecting portion 26 and the folded portion 30 are coupled by a coupling portion 37, and this coupling portion 37 is inclined upward toward the front. That is, the first connecting portion 26 is located higher than the folded portion 30. Further, in a front end part of the first connecting portion 26, both end parts in the width direction are bent downward to form a pair of stopper protrusions 38, 38. In a front end part of the second connecting portion 28, stopper receiving portions 40, 40 configured to abut on the stopper protrusions 38, 38 are provided on both end parts in the width direction.

Further, positioning protrusions 42, 42 projecting rightward are provided on rear end parts of the first and second connecting portions 26, 28. Accordingly, the stopper protrusion 38, the stopper receiving portion 40 and a pair of the positioning protrusions 42, 42 are provided on right end parts of both end parts in the front-rear direction of the first and second connecting portions 26, 28. Right end parts of intermediate parts in the front-rear direction of the first and second connecting portions 26, 28 are located to the left of the stopper protrusion 38, the stopper receiving portion 40 and the pair of positioning protrusions 42, 42. In this way, a clip spring mounting portion 44, on which the clip sporing 24 is mounted, is formed on a right end part in an intermediate part in the front-rear direction of the female terminal fitting 22.

Further, on the outer surfaces in the vertical direction of the first and second connecting portions 26, 28, protrusions 46 projecting outward in the vertical direction are provided in central parts in the width direction. A pair of the protrusions 46 are provided on each of the first and second connecting portions 26, 28 and are separated by a predetermined distance in the front-rear direction. Each protrusion 46 has a substantially triangular or trapezoidal shape when viewed from the front-rear direction, the left surface thereof is a vertical surface 48 expanding substantially in the vertical direction and the right surface thereof is an inclined surface 50 inclined to reduce an outward projection height in the vertical direction toward the right.

On the inner surface (lower surface) of the first connecting portion 26, the second projection-like contact point portion 52 projecting downward (toward the second connecting portion 28) is provided substantially in a center. In the first embodiment, the second projection-like contact point portion 52 is formed by press-working the first connecting portion 26. In this way, a recess 54 open upward is formed at a position corresponding to the second projection-like contact point portion 52, i.e. at a position between the pair of protrusions 46, 46 in the front-rear direction on the outer surface (upper surface) of the first connecting portion 26.

Figure 3:
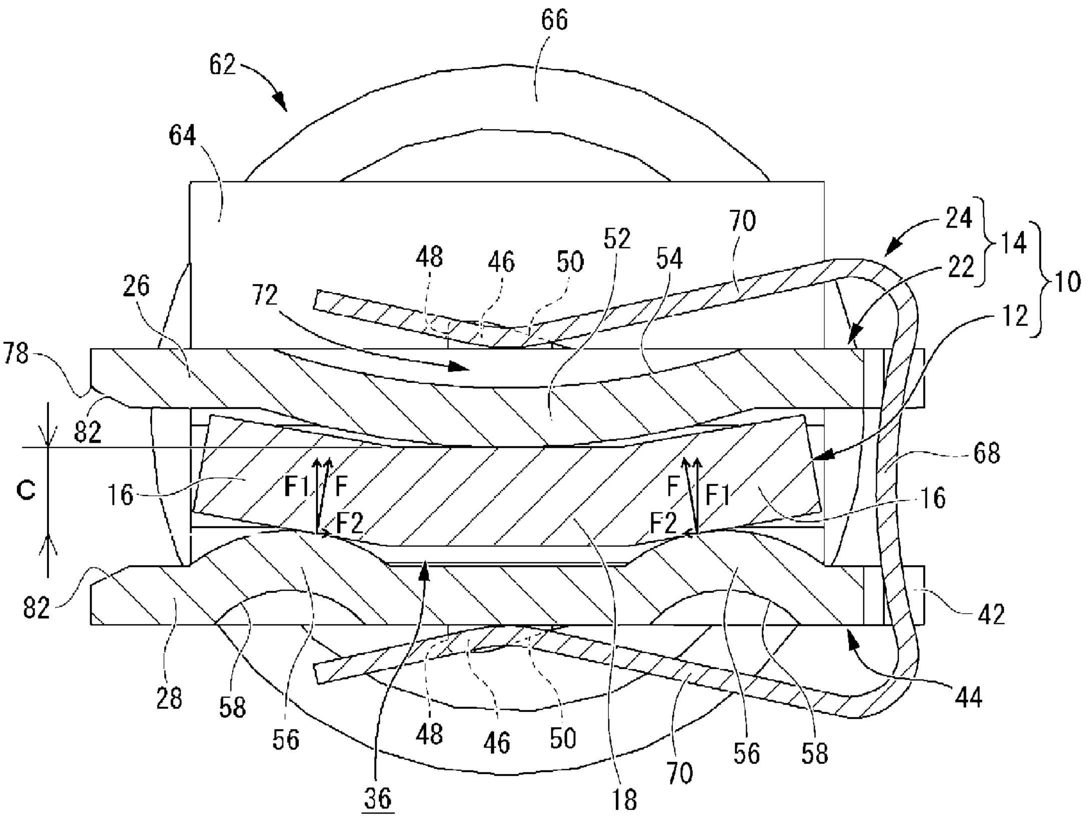
FIG. 3 is a section along in FIG. 1.

The second projection-like contact point portion 52 (recess 54) is substantially circular in a plan view (projection in the vertical direction), and has a substantially arcuate shape in a transverse cross-section of the female terminal 14 shown in FIG. 3. Further, also in a vertical cross-section of the female terminal 14 along a direction orthogonal to the plane of FIG. 3, the second projection-like contact point portion 52 is substantially circular. That is, a part of the second projection-like contact point portion 52 located on a front side in the inserting direction (direction from front to rear or direction from left to right) when the male terminal 12 is inserted into the female terminal 14 as described later has a round chamfered shape. Although being formed to have a substantially constant curvature, the second projection-like contact point portion 52 may have a partially different curvature or may be provided with a flat part.

Figure 4:
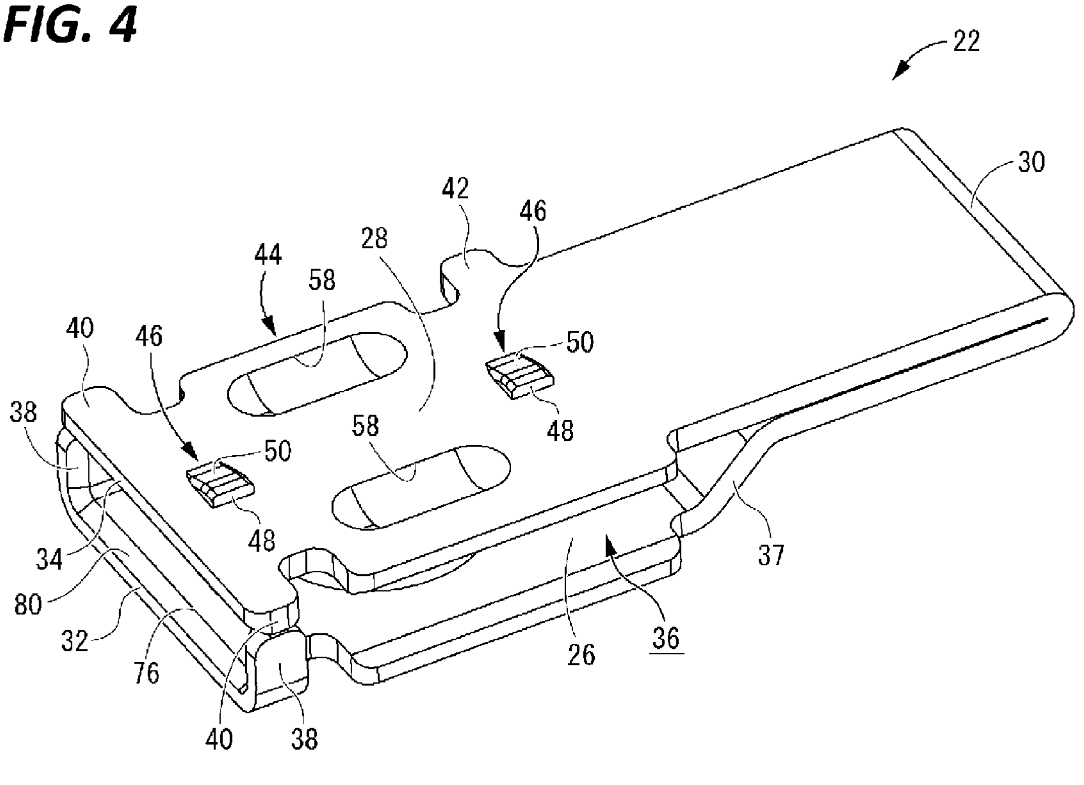
FIG. 4 is a perspective view showing a single female terminal fitting constituting the terminal unit shown in FIG. 1 when viewed from a bottom side.

On the inner surface (upper surface) of the second connecting portion 28, a pair of the first projection-like contact point portions 56, 56 projecting upward (toward the first connecting portion 26) are provided on both sides in the lateral direction. In the first embodiment, the first projection-like contact point portions 56, 56 are formed by press-working the second connecting portion 28. In this way, as also shown in FIG. 4, recesses 58, 58 open downward are formed at positions corresponding to the first projection-like contact point portion 56, i.e. on both sides in the lateral direction between the pair of protrusions 46 and 46 in the front-rear direction on the outer surface (lower surface) of the second connecting portion 28.

The first projection-like contact point portion 56 (recess 58) is substantially elliptical in a plan view and continuously extends over a predetermined length in the front-rear direction. That is, an intermediate part in the front-rear direction of the first projection-like contact point portion 56 extends in the front-rear direction while having an arcuate cross-section shown in FIG. 3. Further, the outer surfaces of both end parts in the front-rear direction of the first projection-like contact point portion 56 are constituted by curved surfaces having a width and an upward projecting dimension gradually reduced toward end parts as also shown in FIG. 2. In the first embodiment, the inserting direction of the male terminal 12 into the male terminal insertion gap 36 is the direction from front to rear as described later, and a part (front end part 60) of the first projection-like contact point portion 56 located on a front side in the inserting direction has a round chamfered shape. Note that although the intermediate part in the front-rear direction of the first projection-like contact point portion 56 has an arcuate shape having a substantially constant curvature as also shown in FIG. 3, this intermediate part may have a partially different curvature or may be provided with a flat part.

A wire 62 is fixed to the folded portion 30, which is the rear end part of the female terminal fitting 22. Specifically, the wire 62 is such a coated wire that a core wire 64 is covered by an insulation coating 66. The core wire 64 exposed by stripping the insulation coating 66 in an end part of the wire 62 is fixed to the upper surface of the folded portion 30 in the female terminal fitting 22. Note that a method for fixing the core wire 64 to the folded portion 30 is not limited and may be, for example, crimping, welding, fusion or the like. Note that the female terminal fitting 22 (female terminal 14) may be fixed to the terminal portion of the device, instead of the wire 62, by a bolt or the like.

Clip Spring 24

The clip spring 24 is formed, using a strip plate of one of various metal materials capable of being press-worked or stamp-worked such as spring steel, stainless steel, brass, phosphor bronze and beryllium copper. The clip spring 24 includes a coupling plate portion 68 substantially in the form of a rectangular flat plate and a pair of sandwiching plate portions 70, 70 projecting toward one side (leftward in FIG. 3) in the plate thickness direction from both side edge parts of the coupling plate portion 68. These sandwiching plate portions 70, 70 are substantially in the form of rectangular flat plates and project in directions approaching each other from the coupling plate portion 68 in a single state of the clip spring 24 before being assembled with the female terminal fitting 22.

Bent parts are provided in intermediate parts in a length direction of the sandwiching plate portions 70, 70, and projecting tip parts of the sandwiching plate portions 70, 70 extend out from the bent parts in directions separating from each other. Accordingly, a facing distance between the sandwiching plate portions 70, 70 is smallest at the bent parts provided in the intermediate parts in the length direction, and a gap between these bent parts serves as an insertion opening 72 for inserting the female terminal fitting 22 into the clip spring 24. An opening dimension A (see FIG. 2) of the insertion opening 72 of the clip spring 24 in the single state is substantially equal to or slightly smaller than a vertical dimension B (see FIG. 2) of the female terminal fitting 22 in the single state. Further, each of the pair of sandwiching plate portions 70, 70 is formed with substantially rectangular locking recesses 74 open outward in a width direction (direction orthogonal to the plane of FIG. 3) of the sandwiching plate portion 70 and penetrating in the plate thickness direction on both end edge parts of the insertion opening 72.

The clip spring 24 shaped as described above is assembled with the female terminal fitting 22 from right. That is, the female terminal fitting 22 and the clip spring 24 are slid and displaced in directions contacting each other by inserting the female terminal fitting 22 through the insertion opening 72 of the clip spring 24. In this way, the pair of sandwiching plate portions 70, 70 of the clip spring 24 sandwich the first and second connecting portions 26, 28 of the female terminal fitting 22 from outside in the vertical direction. Then, the respective protrusions 46 projecting outward from the first and second connecting portions 26, 28 of the female terminal fitting 22 are locked into the respective locking recesses 74 in the clip spring 24. Particularly, since the right surfaces of the respective protrusions 46 are the inclined surfaces 50 and the projecting tip parts of the sandwiching plate portions 70, 70 are inclined in the directions separating from each other, the projecting tip parts of the sandwiching plate portions 70, 70 can easily ride over the respective protrusions 46. Further, the respective locking recesses 74 are stably locked by the vertical surfaces 48, which are the left surfaces of the respective protrusions 46.

Note that the coil spring mounting portion 44 is provided on the right end part in the intermediate part in the front-rear direction of the female terminal fitting 22. In this way, the stopper protrusion 38, the stopper receiving portion 40 and the positioning protrusions 42, 42 are located on the both sides in the front-rear direction of the coupling plate portion 68 as also shown in FIGS. 1 and 3 when the clip spring 24 is mounted on the coil spring mounting portion 44. As a result, in an assembled state of the female terminal fitting 22 and the clip spring 24, the clip spring 24 is prevented from being shifted in position in the front-rear direction with respect to the female terminal fitting 22. That is, the stopper protrusion 38 has both a function of preventing a position shift of the clip spring 24 and a function of securing a space of the male terminal insertion gap 36 to be described later.

Further, since the opening dimension A of the insertion opening 72 of the clip spring 24 in the single state is substantially equal to or slightly smaller than the vertical dimension B of the female terminal fitting 22 in the single state, the sandwiching plate portions 70, 70 are resiliently deformed in the directions separating from each other when the clip spring 24 is assembled with the female terminal fitting 22. Resilient restoring forces of these sandwiching plate portions 70, 70 are applied to the first and second connecting portions 26, 28 from outside in the vertical direction, whereby the first and second connecting portions 26, 28 are biased in the directions approaching each other. Displacements of the first and second connecting portions 26, 28 associated with biasing forces in the directions approaching each other are restricted by the contact of the stopper protrusions 38 in the first connecting portion 26 and the stopper receiving portions 40 in the second connecting portion 28. As a result, the male terminal insertion gap 36 can be stably formed between the first and second connecting portions 26, 28 while the first and second connecting portions 26, 28 are biased in the directions approaching each other. Further, by the application of outward external forces in the vertical direction to the first and second connecting portions 26, 28, the first and second connecting portions 26, 28 are displaced in the directions separating from each other against the biasing forces by the clip spring 24.

By assembling the clip spring 24 with the female terminal fitting 22 from right, a right opening of the male terminal insertion gap 38 is closed by the coupling plate portion 68 of the clip spring 24. In this way, in the female terminal 14, the male terminal insertion gap 36 is open forward and leftward through a front opening 76 and a left opening 78 both having a substantially rectangular shape lager than a cross-sectional shape of the male terminal 12. Note that, in the first embodiment, inclined surfaces 80, 80 gradually expanded toward an opening end part are formed on the inner surfaces of front end parts of the first and second connecting portions 26, 28 in the front opening 76 of the male terminal insertion gap 36. Further, in the left opening 78 of the male terminal insertion gap 36, inclined surfaces 82, 82 gradually expanded toward an opening end part are formed on the inner surfaces of left end parts of the first and second connecting portions 26, 28. In this way, the male terminal 12 is easily inserted into the male terminal insertion gap 36 through the front opening 76 or left opening 78 at the time of insertion of the male terminal 12 into the female terminal 14 described later.

Connection of Male Terminal 12 and Female Terminal 14

In the first embodiment, as also shown in FIG. 2, the male terminal 12 is inserted into the male terminal insertion gap 36 of the female terminal 14 from front through the front opening 76. That is, in the first embodiment, the inserting direction of the male terminal 12 into the male terminal insertion gap 36 is the direction from front to rear. In this way, the upper surface of the male terminal 12 arranged in the male terminal insertion gap 36 faces the first connecting portion 26 and the lower surface of the male terminal 12 faces the second connecting portion 28. As shown in FIG. 3, the second projection-like contact point portion 52 provided substantially in the central part of the first connecting portion 26 contacts the flat portion 18 in the central part in the width direction of the male terminal 12 from above. Along with that, the first projection-like contact point portions 56, 56 provided in the both left and right parts of the second connecting portion 28 contact the inclined portions 16, 16 in the both side parts in the width direction of the male terminal 12 from below. As a result, the male and female terminals 12, 14 are electrically connected.

In the above connected state of the first and second terminals 12, 14, the projecting tip of the second projection-like contact point portion 52 is in point contact with the upper surface of the flat portion 18. Further, in the first embodiment, since extending over a predetermined length in the front-rear direction, the first projection-like contact point portions 56, 56 are in line contact with the lower surfaces of the inclined portions 16, 16. Particularly, in the first embodiment, the first projection-like contact point portions 56, 56 are in contact with the lower surfaces of the inclined portions 16, 16 at positions slightly inward of the projecting tips in the lateral direction in the transverse section shown in FIG. 3.

Figure 5:
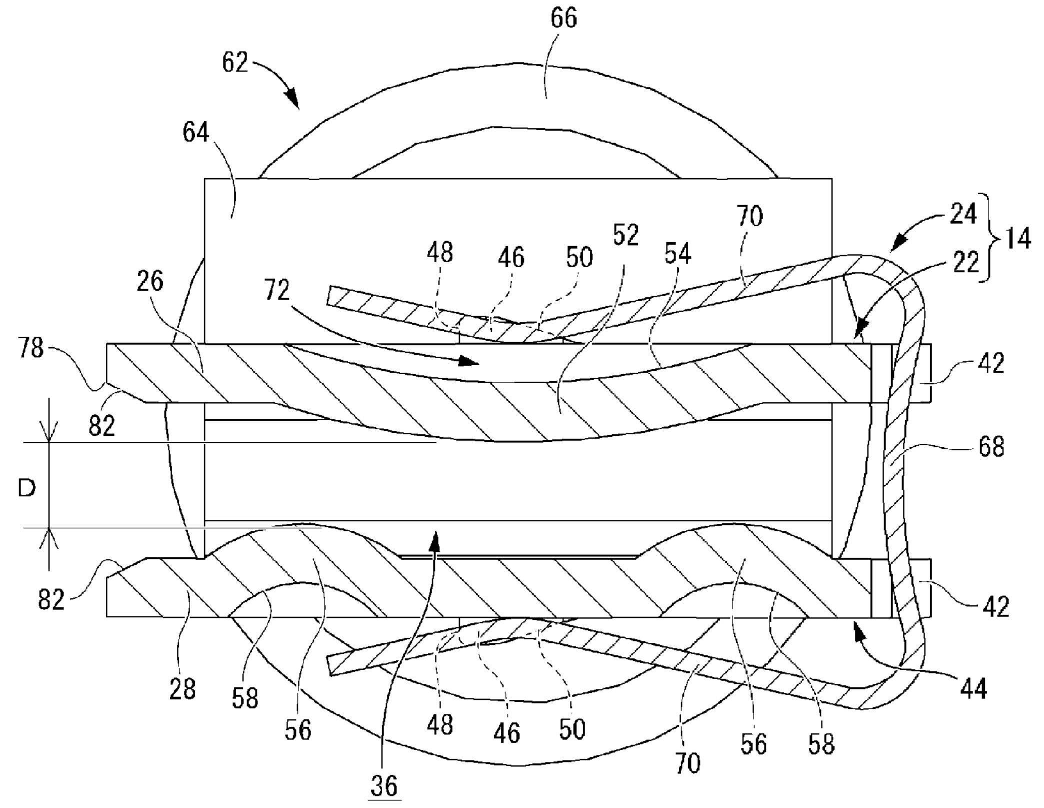
FIG. 5 is a transverse section, equivalent to a cross-section along V-V in FIG. 1, of the female terminal constituting the terminal unit shown in FIG. 1.

Here, a separation distance C in the vertical direction between a contact point on an upper side (contact point between the second projection-like contact point portion 52 and the flat portion 18) and contact points on a lower side (contact points between the first projection-like contact point portions 56, 56 and the inclined portions 16, 16) in the inserted state of the male terminal 12 in the female terminal 14 shown in FIG. 3 is substantially equal to or slightly larger than a separation distance D in the vertical direction at the same position in a state shown in FIG. 5 before the insertion of the male terminal 12 into the female terminal 14. That is, by inserting the male terminal 12 into the male terminal insertion gap 36 of the female terminal 14, the first and second connecting portions 26, 28 are displaced in the directions separating from each other against the biasing forces by the clip spring 24 by the both upper and lower surfaces of the male terminal 12. In short, since the male terminal 12 is press-fit and inserted into the male terminal insertion gap 36, the male and female terminals 12, 14 are more reliably in contact at the upper contact point and the lower contact points.

In the terminal unit 10 of the first embodiment, if an external force is input to the male terminal 12 in the plate width direction (lateral direction) with the male terminal 12 inserted in the female terminal 14, that external force reaches the female terminal 14 through the male terminal 12. As a result, reaction forces against the external force are generated in directions of arrows F in FIG. 3 and applied from the first projection-like contact point portions 56, 56 of the female terminal 14 to the inclined portions 16, 16 of the male terminal 12. By this reaction force F, an upward component force F1 and an inward component force F2 in the lateral direction are generated. That is, even if an external force is input to the male terminal 12 in the plate width direction, inward forces in the lateral direction are generated by the first projection-like contact point portions 56, 56 and the inclined portions 16, 16. Thus, a displacement of the male terminal 12 in the plate width direction is suppressed. As a result, it is possible to suppress fine sliding friction between the female and male terminals 14, 12 due to vibration or the like on a vehicle and an increase of a contact resistance value caused by the fine sliding friction.

The female terminal 14 includes the second projection-like contact point portion 52 substantially in the central part of the first connecting portion 26, and contacts the flat portion 18 of the male terminal 12 from above. In this way, the male terminal 12 can be supported at three points by the pair of first projection-like contact point portions 56, 56 on the both sides in the width direction of the second connecting portion 28 and the second projection-like contact point portion 52 in the widthwise center of the first connecting portion 26, and position shifts of the male and female terminals 12, 14 are effectively prevented.

Since the first projection-like contact point portions 56 are provided over the predetermined length in the front-rear direction, a relatively large contact area of the male and female terminals 12, 14 can be secured. In this way, a contact pressure between the male and female terminals 12, 14 can be reduced. For example, in the case of inserting or withdrawing the male terminal 12 into or from the female terminal 14, the occurrence of troubles such as the peeling of plating due to the friction of the male and female terminals 12, 14 can be suppressed.

Particularly, the parts located on the front sides in the inserting direction of the male terminal 12 in the first projection-like contact point portions 56, 56 and the second projection-like contact point portion 52 have a round chamfered shape. Thus, a sudden increase of insertion resistance is avoided when the male terminal 12 is inserted into the female terminal 14 to bring the first projection-like contact point portions 56, 56 and the inclined portions 16, 16, and the second projection-like contact point portion 52 and the flat portion 18 into contact. As a result, workability in inserting the male terminal 12 into the female terminal 14 can be improved.

Second Embodiment

Figure 6:
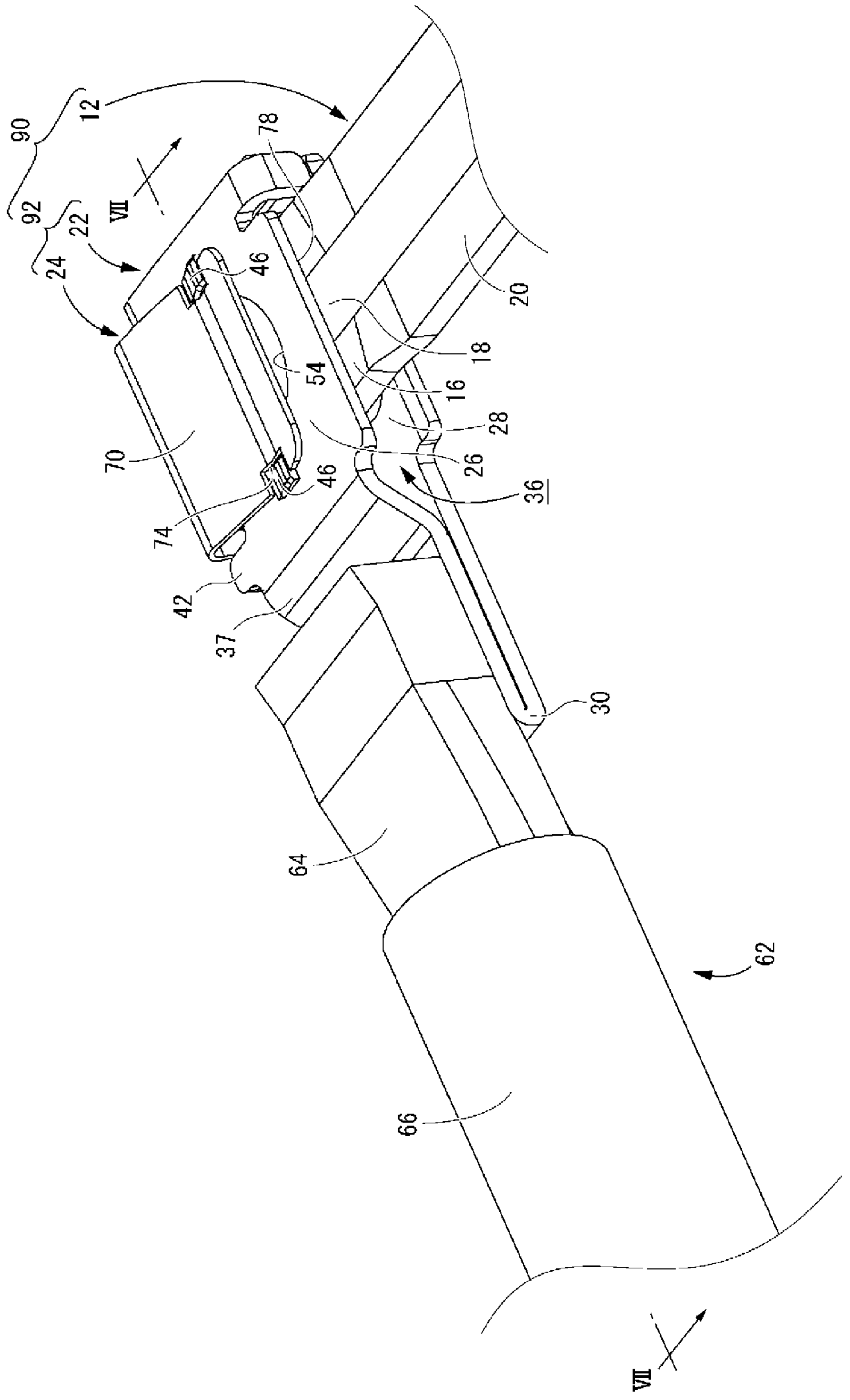
FIG. 6 is a perspective view of a terminal unit according to a second embodiment showing a state where a male terminal is laterally inserted in a female terminal.
Figure 7:
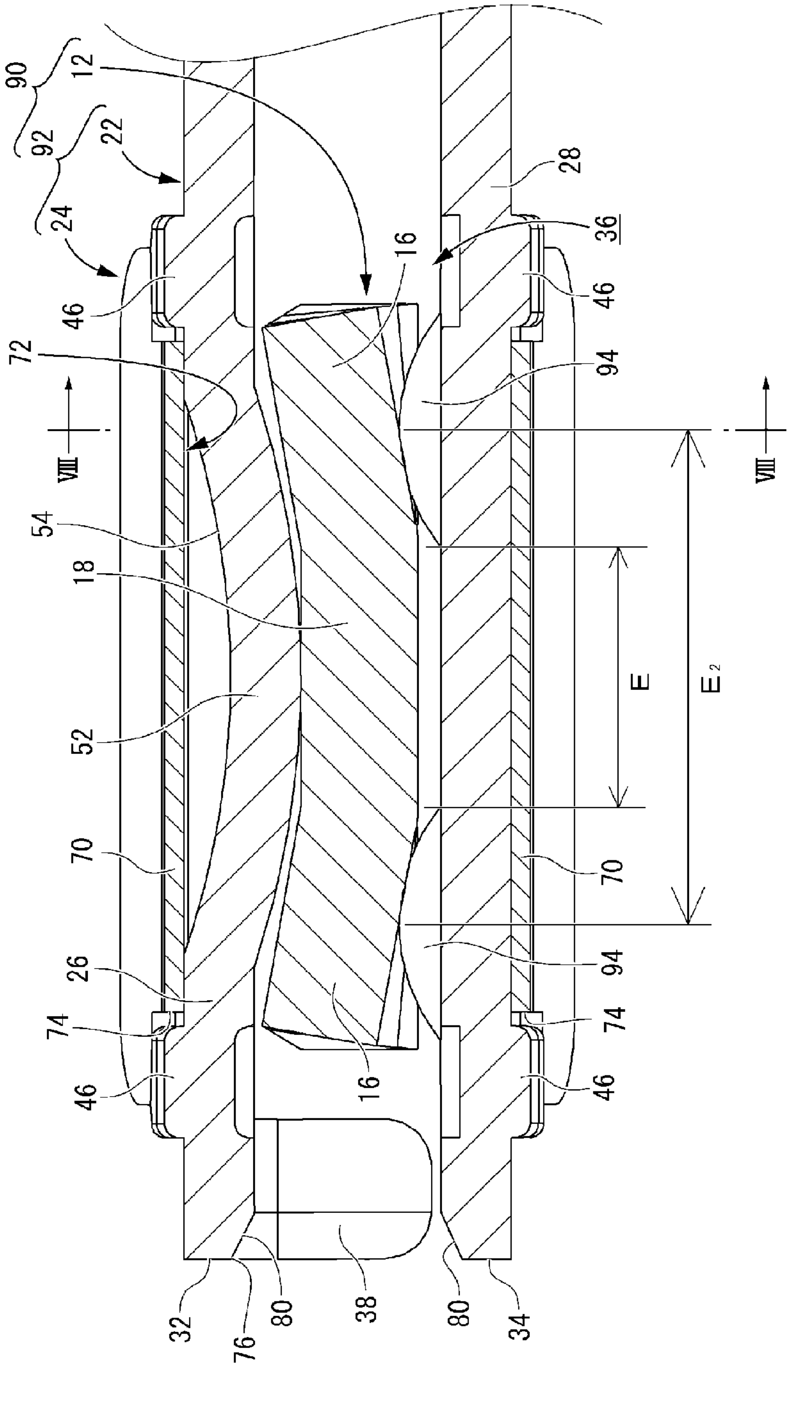
FIG. 7 is a section along VII-VII in FIG. 6.
Figure 8:
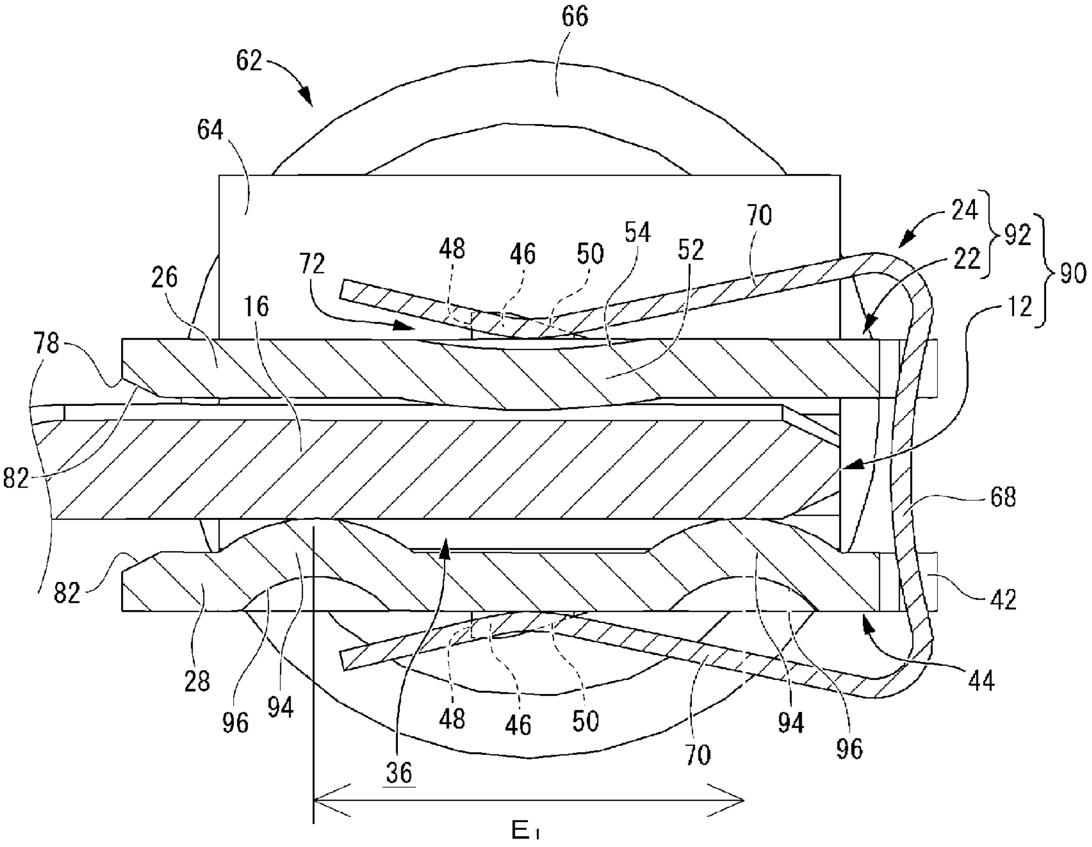
FIG. 8 is a section along VIII-VIII in FIG. 7.

A terminal unit 90 of a second embodiment of the present disclosure is described below, using FIGS. 6 to 11. Note that the terminal unit 90 of the second embodiment is different from the terminal unit 10 of the first embodiment only in the arrangement of first projection-like contact point portions 94 in a female terminal 92. Further, FIGS. 6 to 8 show a state where a male terminal 12 is inserted in a male terminal insertion gap 36 of the female terminal 92 through a left opening 78. That is, in the second embodiment, an inserting direction of the male terminal 12 into the male terminal insertion gap 36 is a direction from left to right, and a plate width direction of the male terminal 12 is a front-rear direction. In the following description, structures and parts substantially identical to those of the first embodiment are denoted by the same reference signs as in the first embodiment in figures and are not described in more detail.

Female Terminal 92

Figure 9:
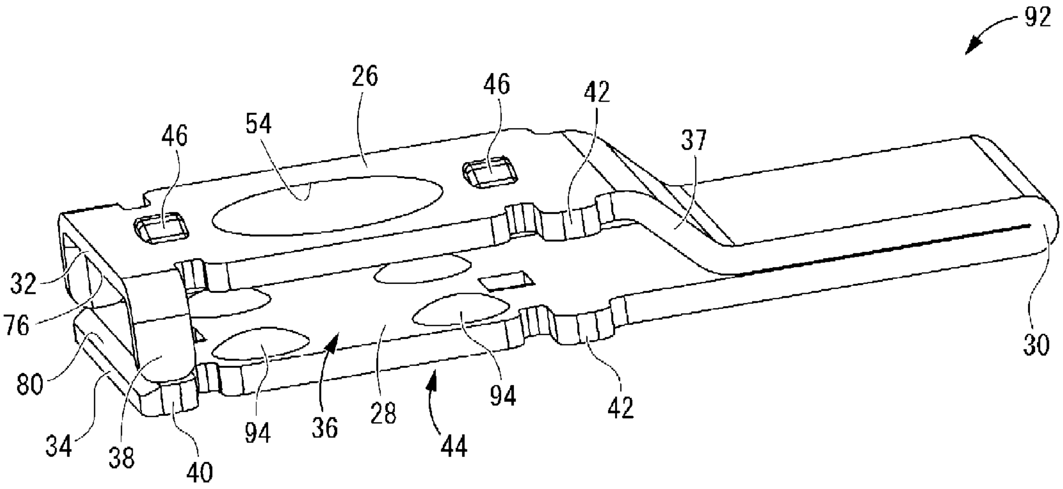
FIG. 9 is a perspective view showing a single female terminal fitting constituting the terminal unit shown in FIG. 6 when viewed from a top side.
Figure 10:
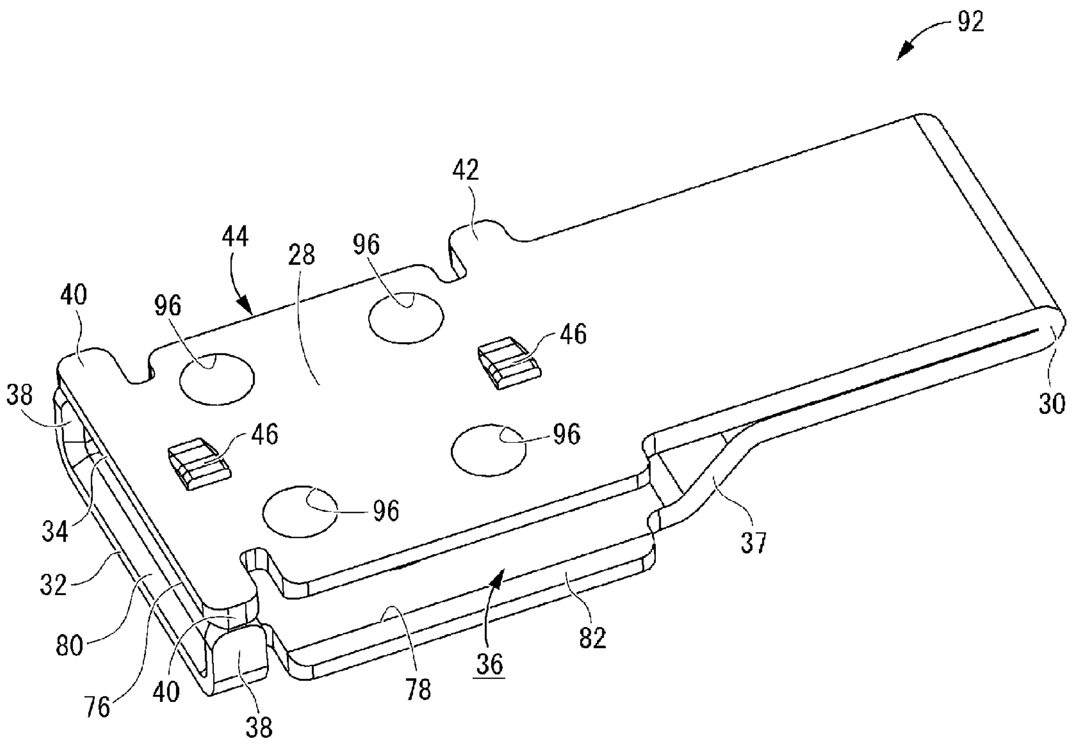
FIG. 10 is a perspective view of the female terminal fitting shown in FIG. 9 when viewed from a bottom side.

As also shown in FIGS. 9 and 10, in the female terminal 92 of the second embodiment, the first projection-like contact point portions 94 are provided at two positions separated from each other at a front side (left side) and a back side (right side) in the inserting direction (lateral direction) on both sides in the front-rear direction, which is the plate width direction of the male terminal 12. That is, in the female terminal 92 of the second embodiment, four first projection-like contact point portions 94 are arranged apart from each other in the front-rear direction and lateral direction. Note that, in the second embodiment, the first projection-like contact point portion 94 has a hemispherical shape or spherical shape having a smaller height than the hemispherical shape. Also in the second embodiment, the first projection-like contact point portion 94 is formed by press-working, and a circular recess 96 open downward is formed at a position corresponding to the first projection-like contact point portion 94 in the outer surface (lower surface) of a second connecting portion 28.

Particularly, in the second embodiment, a separation distance $E_1$ (see FIG. 8) between the first projection-like contact point portions 94, 94 separated from each other in the inserting direction (lateral direction) is larger than a dimension E (see FIG. 7) in the plate width direction (front-rear direction) of a flat portion 18 of the male terminal 12. Further, a separation distance $E_2$ (see FIG. 7) between the first projection-like contact point portions 94, 94 separated from each other in the plate width direction of the male terminal 12 is also larger than the dimension E in the plate width direction of the flat portion 18 of the male terminal 12. Note that the separation distance between the first projection-like contact point portions 94, 94 means a separation distance between centers of the first projection-like contact point portions 94, 94 in a plan view (projection in the vertical direction).

Also in the terminal unit 90 of the second embodiment, since the first projection-like contact point portions 94 contact the inclined portions 16 on the both sides in the plate width direction of the male terminal 12, even if an external force is input to the male terminal 12 in the plate width direction, inward component forces in the plate width direction can be generated and effects similar to those of the first embodiment can be achieved.

Figure 11:
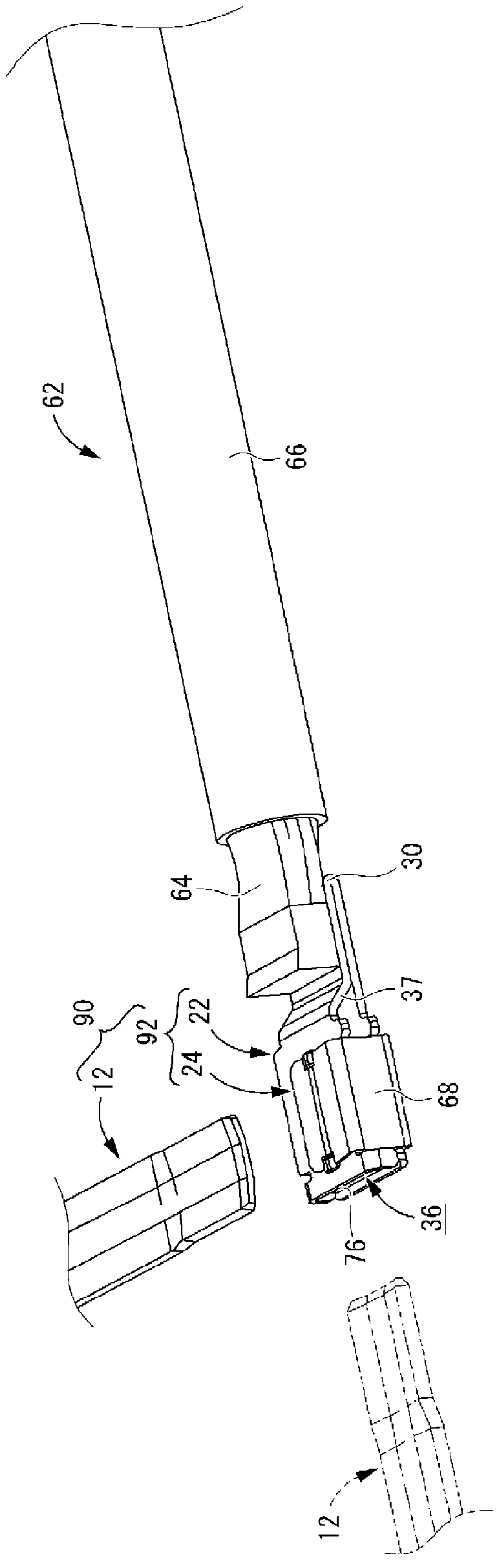
FIG. 11 is a perspective view of the terminal unit shown in FIG. 6 showing a state where the male and female terminals are separated.

Particularly, in the second embodiment, the first projection-like contact point portions 94 are separated by a distance larger than the dimension E in the plate width direction of the flat portion 18 not only in the front-rear direction, but also in the lateral direction. In this way, as shown in FIG. 11, the female terminal 92 of the second embodiment enables not only insertion from left to right through the left opening 78, but also insertion from front to rear through a front opening 76 as in the first embodiment. In FIG. 11, the male terminal 12 in the case of insertion from front to rear is shown by two-dot chain lines. As a result, the female terminal 92 enabling the insertion of the male terminal 12 from two directions can be provided and, eventually, the versatility of the terminal unit 90 can be improved.

Modifications

Although the first and second embodiments have been described in detail as specific examples of the present disclosure above, the present disclosure is not limited by this specific description. The present disclosure encompasses modifications, improvements and the like within such a range that the aim of the present disclosure can be achieved. For example, the following modifications of the embodiments are also included in the technical scope of the present disclosure.

(1) Although the first projection-like contact point portions 56 continuously extend over the predetermined length in the front-rear direction and the male terminal 12 is inserted from front to rear through the front opening 76 in the above first embodiment, there is not limitation to this mode. For example, the male terminal can be inserted from left to right through the left opening by providing the first projection-like contact point portions extending in the lateral direction. By changing an extending direction of the first projection-like contact point portions in this way, it is also possible to change the inserting direction of the male terminal into the female terminal.

(2) If a plurality of the first projection-like contact point portions are provided apart from each other, the first projection-like contact point portions may be provided at three or more positions separated from each other in the inserting direction on the both sides in the plate width direction of the male terminal. In this case, separation distances between the first projection-like contact point portions are not limited, but the first projection-like contact point portions located on the foremost side and on the backmost side in the inserting direction are preferably separated from each other by a predetermined distance and, for example, preferably separated by a distance larger than the dimension in the plate width direction of the flat portion of the male terminal.

(3) The shape of the first projection-like contact point portion is not limited to the elliptical shape as in the first embodiment and the hemispherical shape as in the second embodiment. The first projection-like contact point portion may have, for example, a rectangular parallelepiped shape or cubic shape. In this case, corner parts are preferably chamfered.

(4) The shape of the second projection-like contact point portion is not limited to the one described in the above embodiments. Although the single second projection-like contact point portion 52 is provided in the above embodiments, a plurality of second projection-like contact point portions may be provided. Further, the second projection-like contact point portion 52 can have an arbitrary shape. Note that the second projection-like contact point portion is not essential in the terminal unit of the present disclosure.

(5) Although the male terminal 12 includes the flat portion 18 between the pair of inclined portions 16, 16 in the above embodiments, the flat portion is not essential. The male terminal according to the present disclosure may be shaped such that inclined portions are coupled in a widthwise center of the male terminal.

(6) Although the resilient member is constituted by the clip spring 24 in the above embodiments, a coil spring, an annular elastic body or the like may be, for example, adopted as the resilient member for biasing the pair of connecting portions in the directions approaching each other. Also in such a mode, the female terminal can contact the male terminal with a predetermined contact pressure by inserting the male terminal into the male terminal insertion gap against a biasing force of the resilient member.

LIST OF REFERENCE NUMERALS

10 terminal unit
12 male terminal
14 female terminal
16 inclined portion
18 flat portion
20 flat plate portion
22 female terminal fitting
24 clip spring (resilient member)
26 first connecting portion (connecting portion)
28 second connecting portion (connecting portion)
30 folded portion
32 one end part in length direction
34 other end part in length direction
36 male terminal insertion gap
37 coupling portion
38 stopper protrusion
40 stopper receiving portion
42 positioning protrusion
44 clip spring mounting portion
46 protrusion
48 vertical surface
50 inclined surface
52 second projection-like contact point portion
54 recess
56 first projection-like contact point portion
58 recess
60 front end part
62 wire
64 core wire
66 insulation coating
68 coupling plate portion
70 sandwiching plate portion
72 insertion opening
74 locking recess
76 front opening
78 left opening
80, 82 inclined surface
90 terminal unit
92 female terminal
94 first projection-like contact point portion
06 recess

What is claimed is:

1. A terminal unit, comprising:
a plate-like male terminal; and
a female terminal to be connected to the male terminal,
the female terminal including a pair of connecting portions arranged to face each other across a male terminal insertion gap, the male terminal being inserted into the male terminal insertion gap to be arranged, and a resilient member for biasing the pair of connecting portions in directions approaching each other,
the male terminal including a pair of inclined portions inclined toward one side in a plate thickness direction of the male terminal on both sides in a plate width direction, the plate width direction being a direction intersecting an inserting direction into the male terminal insertion gap, and
the connecting portion of the female terminal facing a surface on the other side in the plate thickness direction of the male terminal including a pair of first projection-like contact point portions configured to respectively contact the pair of inclined portions of the male terminal arranged in the male terminal insertion gap,
wherein the inclined portions of the male terminal and the first projection-like contact point portions of the female terminal are configured to generate component forces directed inward in the plate width direction, thereby limiting lateral displacement of the male terminal relative to the female terminal and reducing fine sliding friction between the terminals caused by vibration of the terminal unit.

2. A terminal unit, comprising:
a plate-like male terminal; and
a female terminal to be connected to the male terminal,
the female terminal including a pair of connecting portions arranged to face each other across a male terminal insertion gap, the male terminal being inserted into the male terminal insertion gap to be arranged, and a resilient member for biasing the pair of connecting portions in directions approaching each other, the male terminal including a pair of inclined portions inclined toward one side in a plate thickness direction of the male terminal on both sides in a plate width direction, the plate width direction being a direction intersecting an inserting direction into the male terminal insertion gap, and the connecting portion of the female terminal facing a surface on the other side in the plate thickness direction of the male terminal including a pair of first projection-like contact point portions configured to respectively contact the pair of inclined portions of the male terminal arranged in the male terminal insertion gap, wherein:

the male terminal includes a flat portion arranged between the pair of inclined portions in the plate width direction, and the connecting portion of the female terminal facing the surface on the one side in the plate thickness direction of the male terminal includes a second projection-like contact point portion configured to contact the flat portion of the male terminal arranged in the male terminal insertion gap, wherein the inclined portions of the male terminal and the first projection-like contact point portions of the female terminal are configured to generate component forces directed inward in the plate width direction, thereby limiting lateral displacement of the male terminal relative to the female terminal and reducing fine sliding friction between the terminals caused by vibration of the terminal unit.

3. The terminal unit of claim 1, wherein the respective first projection-like contact point portions continuously extend in the inserting direction of the male terminal into the male terminal insertion gap.

4. The terminal unit of claim 2, wherein:

the respective first contact point portions are provided at two positions separated from each other in the inserting direction of the male terminal into the male terminal insertion gap, and a separation distance in the inserting direction between the two positions is larger than a dimension in the plate width direction of the flat portion of the male terminal.

5. The terminal unit of claim 1, wherein a part located on a front side in the inserting direction of the male terminal into the male terminal insertion gap in each of the first projection-like contact point portions has a round chamfered shape.

6. The terminal unit of claim 1, wherein an inclination angle of each of the inclined portions with respect to a horizontal direction is 5° or more and 45° or less.

7. The terminal unit of claim 1, wherein the male terminal includes a flat portion arranged between the pair of inclined portions in the plate width direction, and the connecting portion of the female terminal facing the surface on the one side in the plate thickness direction of the male terminal includes a second projection-like contact point portion configured to contact the flat portion of the male terminal arranged in the male terminal insertion gap.

8. The terminal unit of claim 1, wherein each of the first projection-like contact point portions has a front end portion located on a front side in the inserting direction of the male terminal into the male terminal insertion gap, the front end portion having a round chamfered shape.

* * * * *